April 13, 1954 — R. B. TROUSDALE — 2,675,475

MULTIFREQUENCY VOLTAGE GENERATOR

Filed April 15, 1953 — 3 Sheets-Sheet 1

INVENTOR.
Robert B. Trousdale
BY T. L. Bowes
Attorney

April 13, 1954 R. B. TROUSDALE 2,675,475

MULTIFREQUENCY VOLTAGE GENERATOR

Filed April 15, 1953 3 Sheets-Sheet 2

INVENTOR.
Robert B. Trousdale
BY T. L. Bowes
Att'y

April 13, 1954 R. B. TROUSDALE 2,675,475

MULTIFREQUENCY VOLTAGE GENERATOR

Filed April 15, 1953 3 Sheets-Sheet 3

INVENTOR.
Robert B. Trousdale
BY T. L. Bowes
Att'y

Patented Apr. 13, 1954

2,675,475

UNITED STATES PATENT OFFICE 2,675,475

MULTIFREQUENCY VOLTAGE GENERATOR

Robert B. Trousdale, Webster, N. Y., assignor to Stromberg-Carlson Company, a corporation of New York Application April 15, 1953, Serial No. 348,861

14 Claims. (Cl. 250—36)

This invention relates to a voltage generator and, more particularly, to a stable source of different frequency voltages for use in selective party ringing in telephone systems.

Increasing demands for telephone service from existing central telephone office equipment has greatly increased the number of party lines in use in telephone facilities. Each of these party lines is common to a plurality of subscriber stations which are selectively rung by the use of different ringing frequencies. The present equipment utilized for producing these multi-frequency ringing voltages is essentially electro-mechanical or magnetic in nature and requires a large amount of physical space in the exchange for installation. Also, it is difficult to maintain the output frequencies of these magnetic and electromechanical converters so that only the selected subscriber is rung without the use of expensive auxiliary frequency control aparatus. Further, the electromechanical converters inherently include a number of moving parts which must eventually be replaced in order to maintain these converters in adequate operating condition. Some partially electronic ringing machines have been developed, but these machines are subject to the same disadvantages as the prior ringing devices inasmuch as the outputs of both of these types of ringing converters must be passed through filtering means in order to insure application of only the desired frequency to the party telephone lines.

Accordingly, one object of this invention is to provide an all-electronic ringing machine for generating different frequency ringing voltages for use in telephone systems.

Another object of this invention is to provide a novel method and apparatus for maintaining the accuracy of the generated frequency in a plurality of voltage generators by the use of only a single standard frequency source.

Another object is to provide a multi-frequency voltage generator in which the phase of a standard frequency voltage is compared with the phase of a generated output voltage to derive a control signal which is utilized for maintaining the frequency provided by a reference frequency generator at a predetermined value.

Another object of this invention is the provision of a plurality of feedback networks, each of which includes a phase comparison network and an independent oscillator, so that the frequency of the output voltage of each of the oscillators is maintained at a desired value by a phase comparison of a portion of each of the oscillator outputs with the voltage produced under the control of a reference frequency generator.

Another object of the present invention is the provision of a system for generating a plurality of different frequency outputs in which a plurality of independent voltage generators are synchronized with a controllable reference frequency, the frequency of which is maintained at a desired value by the phase comparison of a standard frequency voltage with the output of one of the generating means.

In accordance with these and many other objects, one embodiment of the invention comprises a plurality of phase shift oscillators each of which is designed to provide a different frequency output. A portion of the output of each of the phase shift oscillators is returned to a phase comparison network in which the frequency is compared against the phase of a reference frequency voltage which is an integral sub-multiple of all of the generated frequencies. The phase comparison of these two voltages produces a control voltage which is returned to the phase shift oscillator to control the output frequency thereof. In order to maintain the plurality of output frequencies in synchronism with a standard frequency source, a network is provided for comparing the phase of a standard frequency with the output of one of the phase shift oscillators to derive a control voltage which in turn is applied to the generator of the sub-multiple reference frequency whereby all of the phase shift oscillators are maintained in synchronism with the standard frequency source.

Many other objects and advantages of the present invention will become apparent from a consideration of the following specification when taken in conjunction with the drawings wherein.

Figure 4:
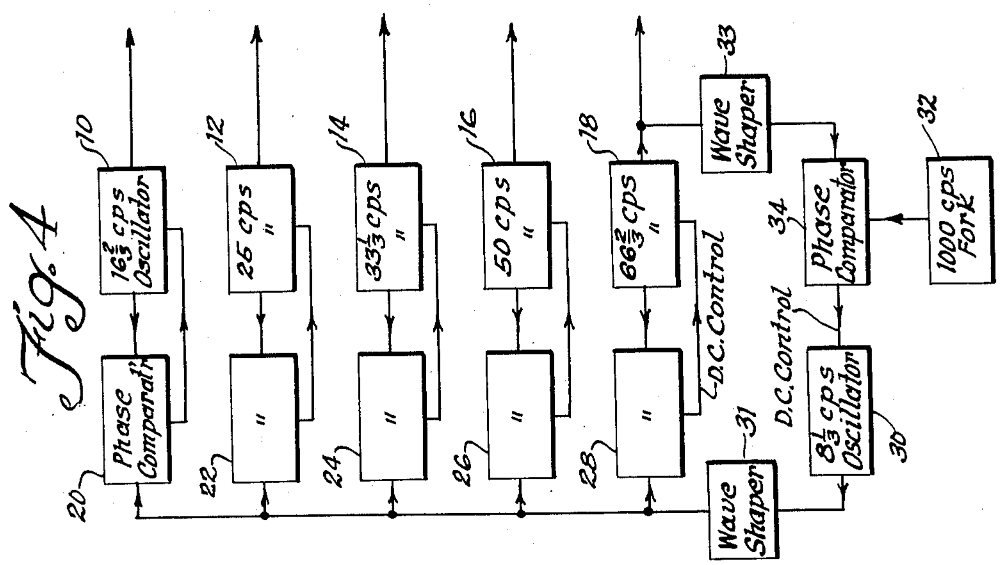
Fig. 4 is a schematic block diagram of the multi-frequency voltage generator shown in Figs. 1 to 3, inclusive, of the drawings.

Referring now to Fig. 4 of the drawings, the ringing machine includes a plurality of independent oscillators 10, 12, 14, 16 and 18, which generate voltages of the desired ringing frequencies, and, as shown in Fig. 4 of the drawings, provide output frequencies of 16⅔, 25, 33⅓, 50 and 66⅔ C. P. S., respectively. The phase of a portion of the output of each of the oscillators 10, 12, 14, 16 and 18 is compared with the phase of a reference voltage having a frequency, which is an integral sub-multiple of all of the generated frequencies, in a plurality of phase comparison circuits 20, 22, 24, 26 and 28. Each of the phase comparison circuits produces a D. C. control voltage in accordance with the difference in phase between the voltage generated by each of the independent oscillators and that provided by a standard reference frequency source 30 and a wave shaper 31. This D. C. voltage controls the independent oscillators so that the output frequencies thereof are maintained at the desired values.

In order to synchronize the output of the plurality of the oscillators 10, 12, 14, 16 and 18 with the frequency of the output voltage from a standard frequency source 32, the output voltage from one of the generators, such as oscillator 18, is transmitted through a wave shaper 33 and is phase compared in a phase comparison circuit 34 with the phase of the output voltage from the standard frequency source 32 to provide a D. C. control voltage. This voltage is applied to the reference frequency generator 30 so that the phase of the output of this oscillator is maintained in synchronism with the output of the standard frequency generator 32, and, accordingly, the outputs of all of the oscillators 10, 12, 14, 16 and 18 are maintained in synchronism with the standard frequency provided by the source 32.

Figure 1:
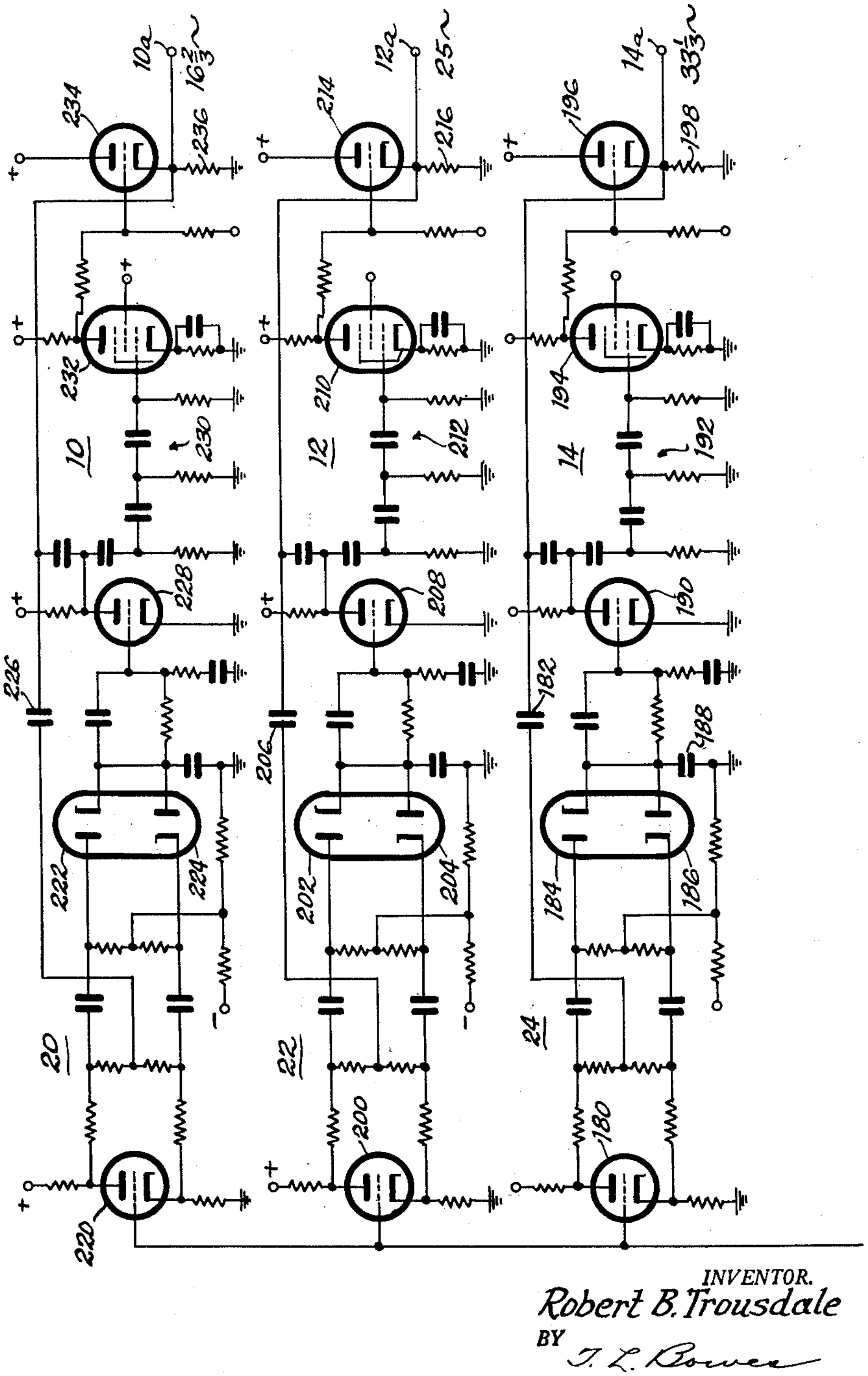
Figs. 1, 2 and 3 are schematic circuit diagrams of a multi-frequency voltage generator embodying the present invention.
Figure 2:
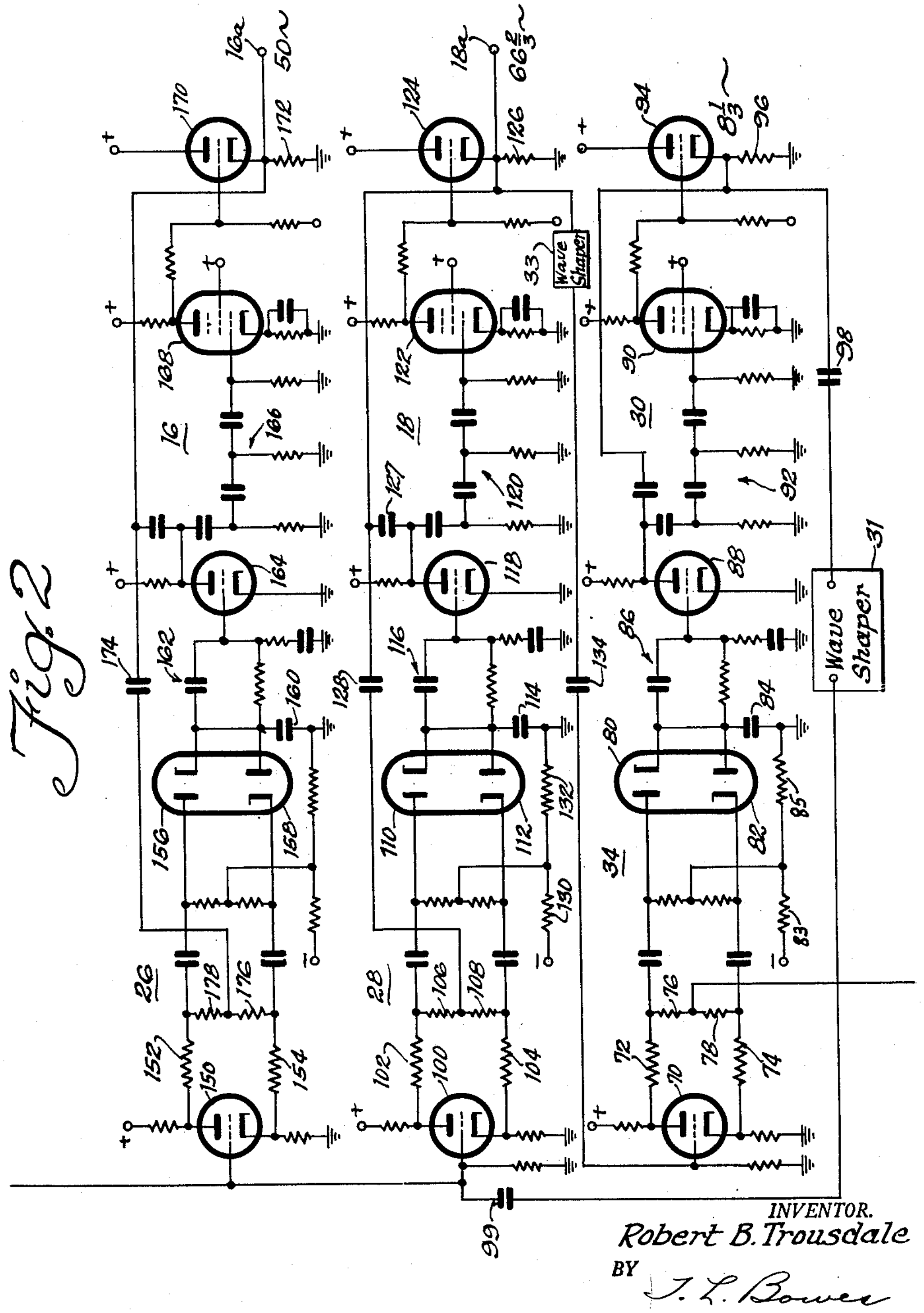
Figure 3:
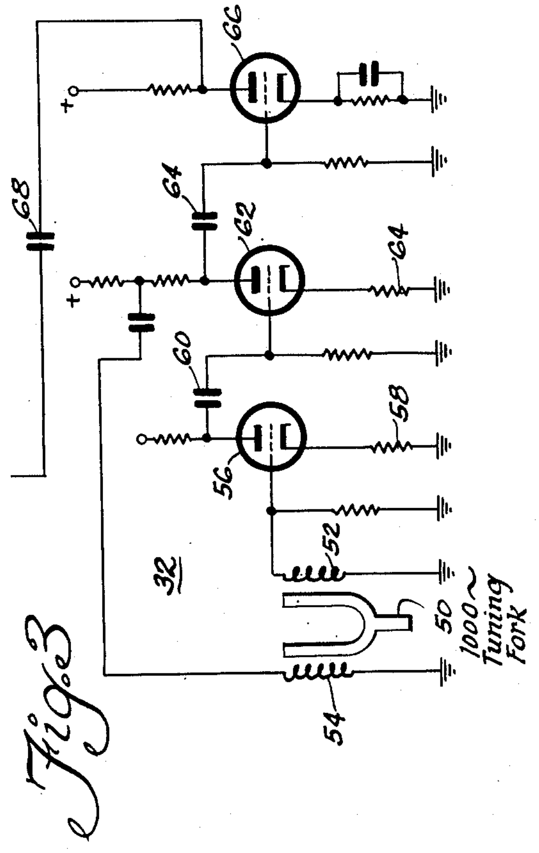
Figure 5:
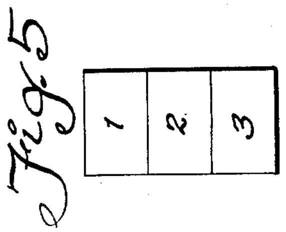
Fig. 5 is a block diagram showing the manner in which Figs. 1 to 3, inclusive, are positioned adjacent each other to form a complete circuit diagram of the multi-frequency voltage generator.

Referring now to Fig. 3 of the drawings wherein is shown the standard frequency source 32 comprising a tuning fork 50 having a pickup coil 52 and a driving coil 54. The undulations of the 1000 C. P. S. tuning fork 50 produce varying voltages in the pickup coil 52 which are coupled to the grid of vacuum tube 56 having an unbypassed cathode resistor 58. These undulations are amplified therein and transmitted through a coupling condenser 60 to the grid of a second vacuum tube 62 having an unbypassed cathode resistor 64. A portion of the amplified voltage appearing at the output of the tube 62 is returned to the driving coil 54 so as to maintain the tuning fork 50 in oscillation. Another portion of the output of the tube 62 is coupled through a condenser 64 to the grid of an amplifier 65 wherein the 1000 C. P. S. reference signal is amplified and is then coupled through a condenser 68 to the phase comparison circuit 34 (Fig. 2).

The phase comparison circuit 34 is also provided with a 66⅔ C. P. S. signal from the oscillator 18 through a condenser 134 and the wave shaper 33. The wave shaper 33 is of any of the types well known in the art and it operates to convert the 66⅔ C. P. S. sine wave produced by the oscillator 18 into a wave of the same base frequency and having a component of the fifteenth harmonic thereof. This modified voltage is applied to the grid of a vacuum tube 70 so that two 180° out of phase components thereof are produced across a pair of mixing resistors 72 and 74. The 1000 C. P. S. signal is applied through a pair of mixing resistors 76 and 78 so that this voltage is added to each of the 180° out of phase components of the 66⅔ C. P. S. voltage provided by the tube 70. One of the composite voltages produced by the addition of the 1000 C. P. S. signal to both of the 66⅔ C. P. S. voltages is applied to the plate of a diode 80 and the other of the composite voltages is applied to the cathode of a diode 82.

The diodes 80 and 82 differentially charge a condenser 84 in accordance with the phase difference between the 66⅔ C. P. S. voltage coupled from the oscillator 18 and the 1000 C. P. S. voltage provided by the tuning fork oscillator 32. This varying D. C. voltage provided by the condenser 84 is coupled through a filter network indicated generally as 86 to the grid of a resistance tube 88. The conduction in the tube 88 is varied in accordance with the voltage applied to the condenser 84 and, therefore, the effective circuit resistance provided by the tube 86 is varied in accordance with the instantaneous value of the charge on the condenser 84. A pair of resistors 83 and 85 which are connected between negative battery and ground provide a potentiometer for setting a normal negative bias on the grid of the tube 88 so that the effective resistance provided by this tube may be adjusted into a desired range of values.

The oscillator 30 includes a pentode 90, the control grid of which is provided with an RC phase shifting network indicated generally as 92 and having the tube 88 on one resistance branch thereof. The output of the pentode 90 is directly coupled to a cathode follower tube 94 having a cathode resistor 96. A portion of the voltage developed across the resistor 96 is returned to the network 92 to maintain the pentode 90 in a state of oscillation.

Accordingly, the frequency of the phase shift oscillator 30 is varied in accordance with the conductivity of the tube 88 forming one of the resistance branches of the phase shift network 92 provided in the control grid circuit of the pentode 90, and, since the conduction through the tube 88 is varied in accordance with the phase difference between the standard 1000 C. P. S. signal and the generated 66⅔ C. P. S. signal provided by the oscillator 18, the 8⅓ C. P. S. signal produced by the oscillator 30 is maintained in synchronism both with the standard frequency signal provided by the tuning fork oscillator 32 and with one of the generated signals.

The 8⅓ C. P. S. sine wave produced at the resistor 96 is coupled through a condenser 98 to the wave shaper 31. The wave shaping circuit 31 is of any of the many types well known in the art and converts the 8⅓ C. P. S. sine wave produced by the generator 30 into a wave having the same base frequency. The 8⅓ C. P. S. sine wave is modified to provide a harmonic content including the second, third, fourth, sixth, and eighth harmonic frequencies of the 8⅓ C. P. S. fundamental frequency and may be formed so as to have an "on" time of 7.5 milliseconds which is one-half of the time interval of one cycle of the 66⅔ C. P. S. signal produced by the generator 18. This "on" time, corresponding to the most positive portion of the output waveform from the wave shaping circuit 31, is chosen to facilitate the production of a large control voltage variation in the phase comparison network 28 but it should be understood that other "on" times could be empirically selected. Also, an individual wave shaping network similar to the circuit 31 could be interposed between the oscillator 30 and each of the phase comparison network 20, 22, 24, 26, and 28 to provide "on" times corresponding to the frequency of the oscillator controlled thereby.

This modified signal is coupled through a condenser 99 to a vacuum tube 100 so as to produce two 180° out of phase components of the 8⅓ C. P. S. signal across a pair of resistors 102 and 104. A pair of mixing resistors 106 and 108 are provided with the 66⅔ C. P. S. signal from the phase shift oscillator 18 through a condenser 128 so that the plate of a diode 110 and the cathode of a diode 112 are provided with the voltages produced by the addition of the 8⅓ C. P. S. signal provided by the tube 100 to the 66⅔ C. P. S. signal provided by the oscillator 18. The diodes 110 and 112, in accordance with the voltages applied thereto, develop a D. C. voltage across a condenser 114 which varies in accordance with the phase difference between the 66⅔ C. P. S. voltage and the 8⅓ C. P. S. voltage. This D. C. voltage is coupled through a filter network 116 and is applied to the grid of a tube 118 which forms one of the resistance branches of a phase shifting network 120 connected to the control grid of a pentode 122. The pentode 122 and the phase shift network 120 form the phase shift oscillator 18 which provides an output frequency 66⅔ C. P. S.

A voltage divider comprising a pair of resistors 130 and 132 connected between ground and a source of negative potential is connected through a pair of resistors to the plate of the diode 110 and the cathode of the diode 112 to provide a means for establishing a negative bias on the grid of the tube 118. By varying the amount of negative bias supplied to this tube, it is possible to set the general level of conduction through the tube 118 so that the resistance provided by this element is set in the mid-range of the value of resistance necessary to maintain the phase shift oscillator 18 at its desired operating frequency of 66⅔ C. P. S.

The output of the pentode 122 is coupled to a cathode follower tube 124 having a cathode resistor 126. A terminal 18a is connected to the resistor 126 to provide a low impedance output for the 66⅔ C. P. S. ringing voltage.

A portion of the voltage provided across the cathode resistor 126 is returned through the coupling condenser 127 to the phase shifting network 120 so that the control grid of the pentode 122 is provided with a voltage approximately 180° out of phase with the output thereof so as to maintain oscillation in the pentode 122.

Another portion of the voltage developed across the resistor 126 is returned through a coupling condenser 128 to the mixing resistors 106 and 108 to provide the 66⅔ C. P. S. signal which is added to the 180° out of phase components of the 8⅓ C. P. S. voltage provided by the tube 100.

An additional portion of the voltage developed by the cathode follower tube 124 is coupled through the condenser 134 to the control grid of the tube 70 so as to provide the phase comparison circuit 34 with a voltage having a frequency of 66⅔ C. P. S.

The filter network 116 is interposed between the diodes 110, 112 and the grid of the tube 118 to prevent the feedback network including the phase shift oscillator 18 and the phase comparison circuit 28 from oscillating at low frequencies. More specifically, the network 116 introduces a proper phase shift so that, at the point at which the phase of the voltage in this feedback network approaches 180°, the magnitude of the real component of the feedback factor is less than unity, and, accordingly, the Nyquist criterion for sustained oscillation is not satisfied.

Accordingly, the oscillator 18 provides an output voltage of a frequency of 66⅔ C. P. S. which is coupled to an output terminal 18a to provide one of the group of harmonic ringing frequencies. A portion of this voltage is returned to the phase shift network 120 to maintain oscillation in the oscillator 18, and another portion of the voltage is phase compared in the circuit 28 with the reference signal of 8⅓ C. P. S. to derive a control voltage dependent upon the phase difference therebetween which is utilized to vary the resistance of one of the branches of the phase shift network 120 so as to maintain the output of the oscillator 18 in synchronism with the reference signal of 8⅓ C. P. S. Also, another portion of the 66⅔ C. P. S. voltage developed by the generator 18 is phase compared in the circuit 34 with the 1000 C. P. S. standard frequency signal provided by the fork oscillator 32 so as to provide a D. C. control voltage for maintaining the output frequency of the oscillator 30 in synchronism with the standard 1000 C. P. S. frequency. Therefore, the frequency of the oscillator 18 is maintained in synchronism with the standard frequency of 1000 C. P. S. provided by the fork oscillator 32.

The above-described circuits for maintaining the oscillator 18 and, accordingly, the oscillators 10, 12, 14, and 16, in synchronism with the 1000 C. P. S. standard frequency includes the oscillators 18 and 30, the wave shaper 31, and the phase comparison networks 28 and 34 which form, in effect, another feedback or servo network which may tend to oscillate at low frequencies.

The filter network 86, which is interposed between the diodes 80 and 82 and the tube 88, provides a satisfactory phase shift in this feedback network for preventing undesired oscillation by insuring that when the phase shift of this network approaches 180°, the real component of the feedback factor is maintained considerably less than unity.

The modified 8⅓ C. P. S. reference signal developed by the wave shaper 31 is also applied to a tube 150 forming a portion of the phase comparison network 26 so as to provide 180° out of phase components of the 8⅓ C. P. S. signal at a pair of mixing resistors 152 and 154. These voltages are combined with a 50 C. P. S. voltage applied to a pair of mixing resistors 176 and 178 by the oscillator 16. These combined voltages are applied to the plate of a diode 156 and the cathode of a diode 158 so as to develop a D. C. control voltage on a condenser 160 which is proportional to the difference in phase between the 8⅓ C. P. S. reference signal and the 50 C. P. S. signal developed by the oscillator 16.

The voltage developed across the condenser 160 is applied through a filter network indicated generally as 162 to the control grid of a resistance tube 164 which forms a portion of a phase shift network 166 connected to the control electrode of a pentode 168. The pentode 168 together with the phase shift network 166 provides a phase shift oscillator of the RC type which generates an output voltage having a frequency of 50 C. P. S. The output voltage from the pentode 168 is coupled to the control electrode of a cathode follower tube 170, and the voltage developed across a cathode resistor 172 is transmitted to an output terminal 16a thereby to provide a source of ringing voltage having a frequency of 50 C. P. S.

A portion of the voltage developed across the resistor 172 is returned through a coupling condenser 174 and added by means of the mixing resistors 176 and 178 with the 180° out of phase components of the 8⅓ C. P. S. reference signal provided across the resistors 152 and 154. The filter network 162 connected in the grid circuit of the resistance tube 164 is so designed as to provide the feedback network including the phase comparison circuit 26 and the oscillator 16 with a phase shift characteristic such that at 180° the real component of the feedback factor is substantially less than unity thereby to prevent sustained oscillations in this network.

The modified 8⅓ C. P. S. reference signal is also applied to a tube 180 in the phase comparison network 24 and is compared therein with a 33⅓ C. P. S. signal developed by the phase shift oscillator 14 and applied to the network 24 through a coupling condenser 182. The resultant voltages produced by the combination of the 8⅓ C. P. S. voltage and the 33⅓ C. P. S. voltage are transmitted through a pair of diodes 184 and 186 to establish a D. C. control voltage on a condenser 188. This voltage is applied to the control grid of a resistance tube 190 so as to control the phase shift characteristic of a phase shifting network 192 which is connected to the control electrode of a pentode 194 forming the phase shift oscillator 14. The output voltage developed by the pentode 194 is coupled to a cathode follower tube 196 and the voltage developed across a cathode resistor 198 thereof is applied to an output terminal 14*a* thereby to provide a synchronized ringing voltage having an output frequency of 33⅓ C. P. S.

The modified 8⅓ C. P. S. reference signal is applied to the control electrode of a tube 200 in the phase comparison network 22, which network also includes a pair of diodes 202 and 204 and operates in the same manner described hereinabove in conjunction with the phase comparison networks 24, 26, 28, and 34 to compare the phase of the 8⅓ C. P. S. signal applied to the tube 200 with a 25 C. P. S. signal produced by the oscillator 12. The 25 C. P. S. signal is returned to the phase comparison network 22 through a coupling condenser 206. The oscillator 12 includes a resistance tube 208, a pentode 210, a phase shifting network 212 connected to the control grid of the pentode 210, and a cathode follower tube 214. The cathode follower tube 214 is provided with a cathode resistor 216 to which is connected an output terminal 12*a* for providing a synchronized and stable source of output voltage having a ringing frequency of 25 C. P. S.

The phase comparison network 20 includes an input tube 220 and a pair of diodes 222 and 224 which operate in a manner described above in conjunction with the description of the operation of the other phase comparison networks to compare the phase of the modified 8⅓ C. P. S. signal supplied to the grid of the tube 220 with a 16⅔ C. P. S. signal produced by the oscillator 10 and returned to the phase comparison network 20 through a coupling condenser 226. The oscillator 10 includes a resistance tube 228 which is controlled by the D. C. voltage developed by the network 20 so as to vary the phase shift characteristic of a phase shifting network 230 which is connected to the control grid of a pentode 232, the output of which is coupled to a cathode follower tube 234. The voltage output developed across a cathode resistor 236 is connected to an output terminal 10*a* to provide a stable source of ringing voltage having a frequency of 16⅔ C. P. S.

Accordingly, the novel ringing frequency voltage generator embodied in applicant's invention provides an all electronic ringing frequency generator in which the frequency of each of the individual oscillators 10, 12, 14, 16 and 18 is maintained at its desired value by means of a phase comparison of the output of each of the oscillators with a reference frequency which is a common denominator of all of the output frequencies. This reference frequency voltage is maintained in synchronism with a standard frequency such as that provided by the fork oscillator 32 by means of the phase comparison of the standard frequency with the output voltage developed by one of the plurality of phase shift oscillators to produce a control voltage for regulating the frequency of the oscillator 30.

Although an RC type of phase shift oscillator is utilized in this electronic ringing machine so that the harmonic content of the voltages provided at the terminals 10*a*, 12*a*, 14*a*, 16*a* and 18*a* is very low, output filters of the type shown in the copending application of John L. Wheeler, Serial No. 348,907, filed April 15, 1953, and entitled Multi-Frequency Voltage Generator, may be used. Also, the D. C. control voltage provided by the plurality of phase comparison circuits can be utilized to control the output frequency of different types of voltage generators other than the phase shift type disclosed above.

Although only one embodiment of the present invention has been disclosed in the drawings and described in the specification, it is to be understood that numerous other embodiments may be devised by those skilled in the art which will fall within the spirit and scope of the principles of this invention.

What is claimed and desired to be secured by Letters Patent of the United States is:

1. A frequency generator comprising a first means for generating an output voltage of a first frequency, a second means for generating an output voltage of a second frequency which is an integral submultiple of said first frequency, and means for comparing the phase of the first and second frequencies to control the frequency of the first generating means.

2. A frequency generator comprising a sine wave generator having an output voltage of a first frequency, a source of voltage having a second frequency, means for comparing the phase of said first frequency voltage with the phase of said second frequency voltage to derive a control voltage, voltage response means for varying the output frequency of said sine wave generator, and means for applying the control voltage to the voltage responsive means for controlling the first frequency.

3. A frequency generator comprising a phase-shift oscillator having an output voltage of a first frequency, a source of voltage having an output frequency integrally related to said first frequency, means for comparing the phase of the first frequency voltage with the phase of the integrally related voltage to derive a control voltage, impedance means forming a portion of the phase-shift oscillator, and means for varying the magnitude of said impedance means in accordance with the control voltage to control the output frequency of said oscillator.

4. A frequency generator comprising means for generating a voltage of a first frequency, a source of voltage having an output frequency integrally related to said first frequency, means responsive to the difference in phase between the first and the integrally related voltages for controlling the means for generating the first frequency voltage, a standard frequency voltage generator, and means responsive to the difference in phase between the standard frequency voltage and the first frequency voltage for controlling the frequency of the source of the integrally related voltage.

5. A multiple frequency voltage generator comprising a plurality of voltage sources of different frequencies, the output frequencies of all of said sources having a frequency which is a common denominator thereof, a control voltage generator having an output frequency related to said common denominator frequency, means for comparing the phase of each of said different frequencies with said common frequency for controlling the output frequency of said plurality of sources, a standard frequency voltage source, and means for comparing the phase of the output frequency of the standard source with the phase of the output frequency of one of the plurality of sources for controlling the output frequency of the control voltage generator.

6. A multiple frequency voltage generator comprising a plurality of voltage sources of different frequencies, said different frequencies having a frequency which is a common denominator thereof, a control voltage generator having an output frequency which is integrally related to said common denominator, means for phase comparing each of the different frequencies with the frequency of the control voltage to develop error voltages, means for applying said error voltages to the plurality of sources to maintain said sources in phase with the control voltage, a standard frequency voltage generator, and means controlled in accordance with the phase of the voltage output of the standard frequency generator and the phase of the voltage output from one of the sources for controlling the output frequency of the control voltage generator.

7. A frequency generator comprising a first means for generating an output voltage of a first frequency, a second means for generating an output voltage having a frequency which is an integral submultiple of said first frequency, means for comparing the phase of said first frequency with the phase of said second frequency to control the frequency of said first generating means, a standard frequency source, and means for comparing the phase of the standard frequency with that of the first generating means for controlling the frequency of the second generating means whereby the first frequency is stabilized by said standard frequency.

8. A multiple frequency voltage generator comprising a plurality of sine wave generators, each of said generators having a different output frequency which is integrally related to a lower control frequency, a voltage generator having an output of said lower control frequency, a plurality of means for comparing the phase of said different frequencies with the phase of said control frequency, means associated with each of said sine wave generators for varying the output frequency thereof under the control of one of said phase comparing means, a standard frequency source of voltage, and means for controlling the frequency of all of the sine wave generators in accordance with the frequency of the standard source.

9. The voltage generator defined by claim 8 in which the lower control frequency voltage includes harmonic frequencies of the same frequencies as the output frequencies of the sine wave generator.

10. A controlled frequency voltage generator comprising a first voltage generator having a first output frequency, a second voltage generator having a second output frequency which is integrally related to the first frequency, means for comparing the phase of the voltages produced by the first and second generators to derive a first control voltage, means for varying the first frequency in accordance with the first control voltage, a third voltage generator having a standard frequency output, means for comparing the phase of the voltage output from the third and the second voltage generators to derive a second control voltage, and means for varying the output frequency of the second generating means in accordance with the second control voltage.

11. The frequency generator defined in claim 10 in which the second frequency is a subharmonic of both the standard frequency and the first frequency.

12. A frequency generator comprising a first means for generating an output voltage of a first frequency, a second means for generating a voltage of a second frequency, means for comparing the phase of the first and second frequency voltages to provide a control voltage, means for applying the control voltage to the first generating means to control the frequency thereof, and circuit means energized by the control voltage for preventing oscillation of a network including the first generating means and the phase comparing means.

13. An oscillatory voltage generator comprising first means for generating a voltage of a first frequency, second means for generating a voltage of a second frequency, means responsive to a change in the difference between the first and second frequencies controlling the output frequency of the first generating means, a standard frequency voltage generator, and means responsive to a change in the difference between the first frequency and the standard frequency for controlling the output frequency of the second generating means.

14. A controlled frequency voltage generator comprising a first voltage generator having a first output frequency, a second voltage generator having a second output frequency which is integrally related to the first frequency, means energized by the second generator for varying the harmonic content of the output voltage of the second generator, means for comparing the phase of the voltages produced by the first generator and the varying means to derive a first control voltage, means for varying the first frequency in accordance with the first control voltage, a third voltage generator having a standard frequency output, means for comparing the phase of the voltage output from the third and the second voltage generators to derive a second control voltage, and means for varying the output frequency of the second generating means in accordance with the second control voltage.

References Cited in the file of this patent

UNITED STATES PATENTS

| Number | Name | Date |
|---|---|---|
| 1,412,908 | Van Dyke | Apr. 18, 1922 |
| 2,277,809 | Wrathall | Mar. 31, 1942 |
| 2,461,547 | Huge | Feb. 15, 1949 |